US008088521B2

United States Patent
Ju et al.

(10) Patent No.: US 8,088,521 B2
(45) Date of Patent: Jan. 3, 2012

(54) FUEL CELL SYSTEM FOR COMPUTING FUEL LEVEL

(75) Inventors: Ri-a Ju, Suwon-si (KR); Dong-rak Kim, Suwon-si (KR); Jin-hong An, Suwon-si (KR); Ho-jin Kweon, Suwon-si (KR); Sang-kyun Kang, Suwon-si (KR)

(73) Assignee: SAMSUNG SDI Co., Ltd., Gyeonggi-do (KR)

( * ) Notice: Subject to any disclaimer, the term of this patent is extended or adjusted under 35 U.S.C. 154(b) by 1096 days.

(21) Appl. No.: 11/934,618

(22) Filed: Nov. 2, 2007

(65) Prior Publication Data

US 2008/0107940 A1 May 8, 2008

(30) Foreign Application Priority Data

Nov. 3, 2006 (KR) .................. 10-2006-0108459

(51) Int. Cl.
*H01M 8/04* (2006.01)
(52) U.S. Cl. .............. 429/428; 429/447; 429/515
(58) Field of Classification Search .............. None
See application file for complete search history.

(56) References Cited

U.S. PATENT DOCUMENTS

| 4,839,574 A * | 6/1989 | Takabayashi ........ 320/101 |
| 2006/0127719 A1* | 6/2006 | Brantley et al. ........ 429/20 |

FOREIGN PATENT DOCUMENTS

| JP | 2003-217634 | | 7/2003 |
| JP | 2004-213945 A | | 7/2004 |
| JP | 2005-322572 | | 11/2005 |
| JP | 2006-040742 | | 2/2006 |
| JP | 2006-185605 A | | 7/2006 |
| JP | 2006-294471 | * | 10/2006 |
| KR | 10-2004-0104841 A | | 12/2004 |
| KR | 10-2006-0135139 A | | 12/2006 |

* cited by examiner

*Primary Examiner* — Jonathan Crepeau
(74) *Attorney, Agent, or Firm* — Knobbe, Martens, Olson & Bear LLP

(57) ABSTRACT

A fuel cell system capable of computing fuel level stored in a fuel tank, and more particularly to a fuel cell system capable of computing fuel level without using a flux sensor or flow rate sensor includes: a fuel tank storing fuel; a stack for generating electricity by the electro-chemical reaction of the fuel; a fuel pump for transferring fuel from the fuel tank to the stack; a fuel pump for transferring the fuel from the fuel tank to the stack; a pumping controller for generating a pump control signal controlling the pumping operation of the fuel pump; and a fuel level computing unit for computing the amount of fuel used and fuel level from the waveform of the pump control signal. In some embodiments, the fuel cell system informs a user when the fuel level is low, with reduced manufacturing costs.

5 Claims, 2 Drawing Sheets

FUEL CELL SYSTEM FOR COMPUTING FUEL LEVEL

CROSS-REFERENCE TO RELATED APPLICATIONS

This application claims the benefit of Korean Patent Application No. 10-2006-0108459, filed on Nov. 3, 2006, in the Korean Intellectual Property Office, the disclosure of which is incorporated herein by reference.

BACKGROUND

1. Technical Field

The present disclosure relates to a fuel cell system capable of computing fuel level in a fuel tank, and more particularly to a fuel cell system capable of computing fuel level without using a flux sensor or flow rate sensor.

2. Discussion of Related Art

A fuel cell is a power generation system that directly converts energy from a chemical reaction, for example, between hydrogen and oxygen contained in organic substances, such as methanol, ethanol and natural gas, into electrical energy.

According to the type of electrolyte used, fuel cells can be sorted, for example, into phosphoric acid fuel cells, molten carbonate fuel cells, solid oxide fuel cells, polymer electrolyte fuel cell, and alkaline fuel cells. These respective fuel cells operate on the basic same principle, but differ in the types of fuels used, operating temperatures, catalyst, electrolytes, and the like.

Among the types, the polymer electrolyte membrane fuel cell (PEMFC) has advantages of remarkably high output, low driving temperature, and rapid start and response compared with other types of fuel cells, and can be widely applied as a mobile power source such as for portable electronic equipment or as a transportable power source such as a power source for an automobile as well as a distributed power source such as a stationary power plant used in a house and a public building, and the like.

A type of fuel cell is known as a direct methanol fuel cell (DMFC), which is similar to the polymer electrolyte membrane fuel cell but in which liquid methanol fuel is directly supplied to a stack. A DMFC includes, for example, a stack, a fuel tank, and a fuel pump. A hydrogen-containing fuel electrochemically reacts with an oxidant, such as oxygen, air, or the like, in the stack to generate electrical energy. Such a stack comprises several to several hundreds unit fuel cells, in which a membrane electrode assembly (MEA) and a separator are stacked. Herein, the membrane electrode assembly comprises an anode electrode (namely, "fuel electrode" or "oxidation electrode") and a cathode electrode (namely, "air electrode" or "reduction electrode") attached to each other, with a polymer electrolyte membrane disposed therebetween. The DMFC has a low operating temperature and can be miniaturized, and so is advantageous as a power supply for portable equipment such as notebook computers or portable game machines. However, when a fuel cell is used to power a notebook or similar device, unexpectedly running out of fuel during use is very undesirable. Therefore, a means for informing a user of the fuel level in the fuel tank, and in particular, a low fuel level, is useful.

Meanwhile, in the case of the DMFC, fuel may be supplied in exchangeable cartridges of predetermined size. In such an exchangeable cartridge system, informing a user that the fuel is almost depleted in the cartridge-in-use permits the user to exchange the cartridge for uninterrupted use of the device.

To this end, a flux meter is installed in the fuel tank or a sensing means such as a flux meter or a flow meter is installed in a fuel flow path from the fuel tank such that the residual or remaining fuel level in the fuel tank may be measured or computed. However, installing an extra flux meter or flow meter increases manufacturing costs as well, thereby complicating miniaturization or weight reduction of the fuel cell. Also, disposing a fuel sensing device in a disposable cartridge increases the cost of the cartridge.

SUMMARY OF THE INVENTION

Some embodiments solve the above and/or other problems. It is an object to provide a fuel cell system capable of measuring fuel level in the fuel cell without an extra sensing apparatus. Also, it is another object to provide a fuel cell system capable of informing a user whether refuel is needed or not, with low manufacturing costs.

In order to accomplish these objects, a fuel cell system includes: a fuel tank storing fuel; a stack for generating electricity by the electrochemical reaction of the fuel; a fuel pump for transferring fuel from the fuel tank to the stack; a pumping controller for generating a pump control signal controlling the pumping operation of the fuel pump; and a fuel level computing unit for computing the amount of fuel used and fuel level from the waveform of the pump control signal.

Other embodiments provide a fuel cell system comprising: a fuel tank configured for storing fuel; a fuel cell stack operable for generating electricity by an electrochemical reaction of a fuel and an oxidant; a fuel pump fluidly connecting the fuel tank and the stack; a pumping controller coupled to the fuel pump and operable for generating a pump control signal for controlling the operation of the fuel pump; and a fuel level computing unit operable for computing the amount of fuel used and a fuel level in the fuel storage tank from a waveform of the pump control signal.

Some embodiments further comprise a temporary tank fluidly connecting the fuel tank and the stack, configured for temporarily storing fuel.

In some embodiments, the fuel level computing unit is configured to record the calculated fuel level therein, and resets the recorded fuel level value to a capacity of the fuel tank when the fuel tank is refilled.

In some embodiments, the fuel pump comprises a diaphragm pump, and the fuel level computing unit is configured to determine the amount of fuel used by a method comprising multiplying a number of pulses in the pump control signal by a single pulse pumping throughput of the diaphragm pump. In some embodiments, the fuel pump comprises a piezo injection pump, and the fuel level computing unit is configured to determine the amount of fuel used by multiplying a number of pulses in the pump control signal by a single pulse pumping throughput of the piezo injection pump. In some embodiments, the pump control signal comprises a PWM signal, and the fuel level computing unit is configured to determine the amount of fuel used by a method comprising integrating the PWM signal to obtain a time-on value and multiplying the time-on value by the pumping throughput per the unit time.

Other embodiments provide a fuel cell system comprising: a fuel tank configured for storing fuel for power generation; a fuel cell stack configured for generating electricity through an electrochemical reaction between the fuel and an oxidant; a fuel dilution tank fluidly connected to the fuel tank and the stack, configured for diluting the fuel to a predetermined concentration; a fuel pump fluidly connected to the fuel tank and the fuel dilution tank, configured to pump fuel from the fuel tank to the fuel dilution tank; a pumping controller coupled to the fuel pump configured for generating a pump control signal controlling the operation of the fuel pump; and a fuel level computing unit configured for computing the amount of fuel used and fuel level from a waveform of the fuel pump control signal.

Some embodiments further comprise a condenser fluidly connected to the fuel dilution tank, operable for condensing water from a cathode effluent into the fuel dilution tank.

In some embodiments, the fuel dilution tank comprises a fuel concentration sensing apparatus outputting a fuel concentration value to the pumping controller, operable for sensing the concentration of diluted fuel in the fuel dilution tank, and the waveform of the pump control signal depends on the fuel concentration value.

In some embodiments, the fuel level computing unit is configured to record the computed fuel level therein, and to reset the recorded fuel level value to the full capacity of the fuel tank when the fuel tank is refilled.

In some embodiments, the fuel pump comprises a diaphragm pump, and the fuel level computing unit is configured to determine the amount of fuel used by a method comprising multiplying a number of pulses in the pump control signal by a single pulse pumping throughput of the diaphragm pump. In some embodiments, the fuel pump comprises a piezo injection pump, and the fuel level computing unit is configured to determine the amount of fuel used by a method comprising multiplying a number of pulses in the pump control signal by a single pulse pumping throughput of the piezo injection pump. In some embodiments, the pump control signal comprises a PWM signal, and the fuel level computing unit is configured to determine the amount of fuel used by a method comprising integrating the PWM signal to obtain a time-on value and multiplying the time-on value by the pumping throughout per the time.

BRIEF DESCRIPTION OF THE DRAWINGS

These and/or other embodiments and features will become apparent and more readily appreciated from the following description of certain exemplary embodiments, taken in conjunction with the accompanying drawings of which.

DETAILED DESCRIPTION OF EXEMPLARY EMBODIMENTS

Figure 1:
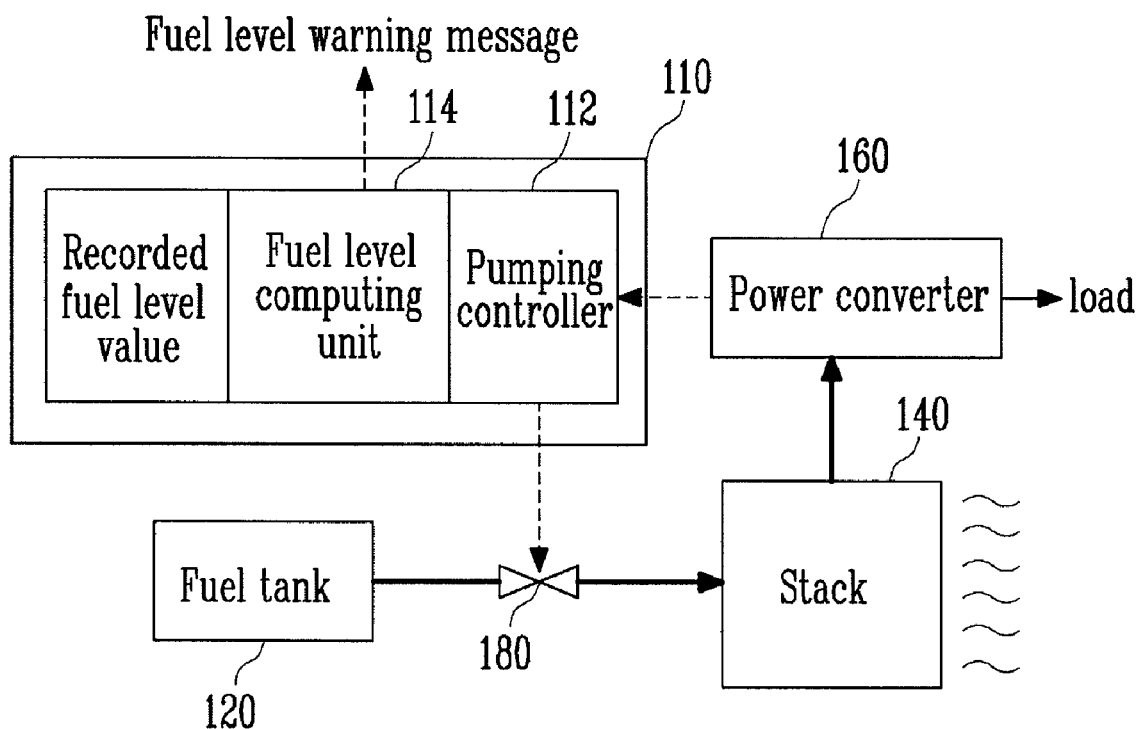
FIG. 1 is a schematic view showing a fuel cell system according to one embodiment.

Hereinafter, certain exemplary embodiments will be described with reference to the accompanying drawings. Here, when a first element is described as being coupled to a second element, the first element may be not only directly coupled to the second element but may also be indirectly coupled to the second element through one or more third elements. Further, elements that are not essential to the complete understanding of the invention are omitted for clarity. Also, like reference numerals refer to like elements throughout.

Referring to FIG. 1, a fuel cell system according to the illustrated embodiment includes: a fuel tank 120 storing fuel for power generation; a stack 140 for generating electricity by an electrochemical reaction between the fuel and an oxidant; a fuel pump 180 for transferring the fuel from the fuel tank 120 to the stack 140; a pumping controller 112 for generating a pump control pulse signal controlling the operation of the fuel pump 180; and a fuel level computing unit 114 for computing the amount of fuel used and the fuel level by monitoring the pump control pulse.

In the case of the fuel cell system according to the embodiment, the fuel in the fuel tank 120 is directly supplied to the stack 140 by means of the fuel pump. In miniaturized embodiments, that the fuel in the fuel tank 120 is diluted to a concentration suitable for direct use at the anode of the stack 140. Although the pumping controller 112 and/or the fuel level computing unit 114 may comprise a separate hardware module, in some preferred embodiments, the pumping controller 112 and the fuel level computing unit 114 are implemented in a system comprising a controller 110 (CPU) of the fuel cell system and a software module comprising a program executable by the controller 110 stored in a machine-readable medium therein. This embodiment is described below.

As the fuel supplied to the stack 140 is consumed, the pumping controller 112 sends a fuel control signal actuating the fuel pump 180 to supply additional fuel to the stack 140. The fuel consumption may be determined by measuring the output power (current and/or voltage) of the stack 140 or the power converter 160. In other words, in this embodiment, rather than directly controlling the amount of fuel pumped by the fuel pump 180, the pumping controller 112 controls the fuel flow by a feedback-control of the fuel pump 180 that depends on the state of the stack or the load, which is simpler to implement than direct control. In another embodiment comprising a fuel sensor mounted on the stack or the fuel line connected thereto, if the fuel sensor detected the flow of fuel, the pump control signal can be generated and if the fuel sensor does not detect the flow of fuel, the pump control signal cannot be generated.

In some embodiments in which the system is miniaturized, the fuel pump 140 comprises a diaphragm pump or a piezo injection pump. In this case, the diaphragm pump or the piezo injection pump undergoes one pumping cycle in response to a transition or pulse in the control signal. Accordingly, the amount of fuel pumped is about proportional to the number of pulses in the control signal. Embodiments comprising a DC motor pump are described in greater detail below.

In some embodiments, the fuel tank 120 is refillable or comprises an exchangeable cartridge. When the cartridge is exchanged or the fuel tank 120 is refilled, the fuel level computing unit 114 resets the fuel level value to the entire capacity of the fuel tank 120.

Figure 2:
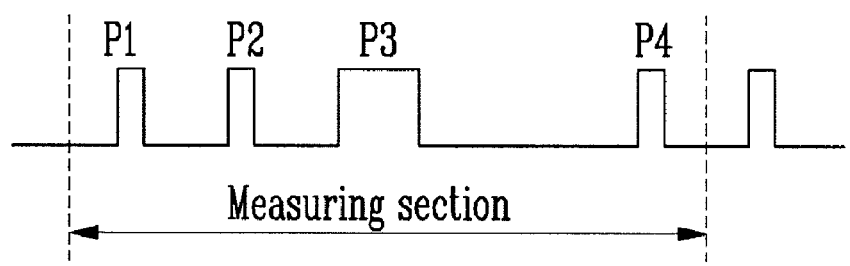
FIG. 2 is a view showing a control pulse sequence for driving a fuel pump of the fuel cell system of FIG. 1.

Thereafter, when the output of the stack 140 or the power converter 160 indicates a need for fuel, the pumping controller 112 generates a number of pump control pulses corresponding to the amount of fuel needed. In the case of a miniaturized system, the number of the pump control pulses generated when supplying fuel may be fixed. In some embodiments, the fuel level computing unit 114 computes the amount of fuel used from the pumping pulses. In the case as shown in FIG. 2, the amount of fuel used in a given fuel level measuring section may be obtained by multiplying the number of the pumping pulses (P1, P2, P3 and P4 for a total of 4) by the amount of fuel pumped in a single pulse. Thereafter, the fuel level computing unit 114 subtracts the computed amount of fuel used from the fuel level value, updating and recording so that the fuel level.

The fuel level value recorded in the fuel level computing unit 114 is not deleted but is retained even when the fuel cell system stops. As such, whenever the fuel cell system is used, the fuel level in the fuel tank 120 may be determined according to the number of pumping cycles of the fuel pump 180. When the fuel level is less than a predetermined amount, the fuel level computing unit 114 may output a low fuel warning message to a user.

The fuel cell system according to the embodiment may further include a temporary fuel tank (not shown) for temporarily storing fuel, disposed between the fuel tank 120 and the stack. In this case, operation of the fuel pump 180 does not indirectly depend on the output of the stack as discussed above, but depends on a physical state of the temporary tank. In other words, the temporary tank supplies a generally constant stream of fuel to the stack 140, for example, by means of elastic restoring force, or the like, of the temporary tank itself, and when the amount of fuel in the temporary tank becomes less than a predetermined value, the pumping controller 112 generates a pump control pulse to transfer fuel from the fuel tank 120 to the temporary tank.

Figure 3:
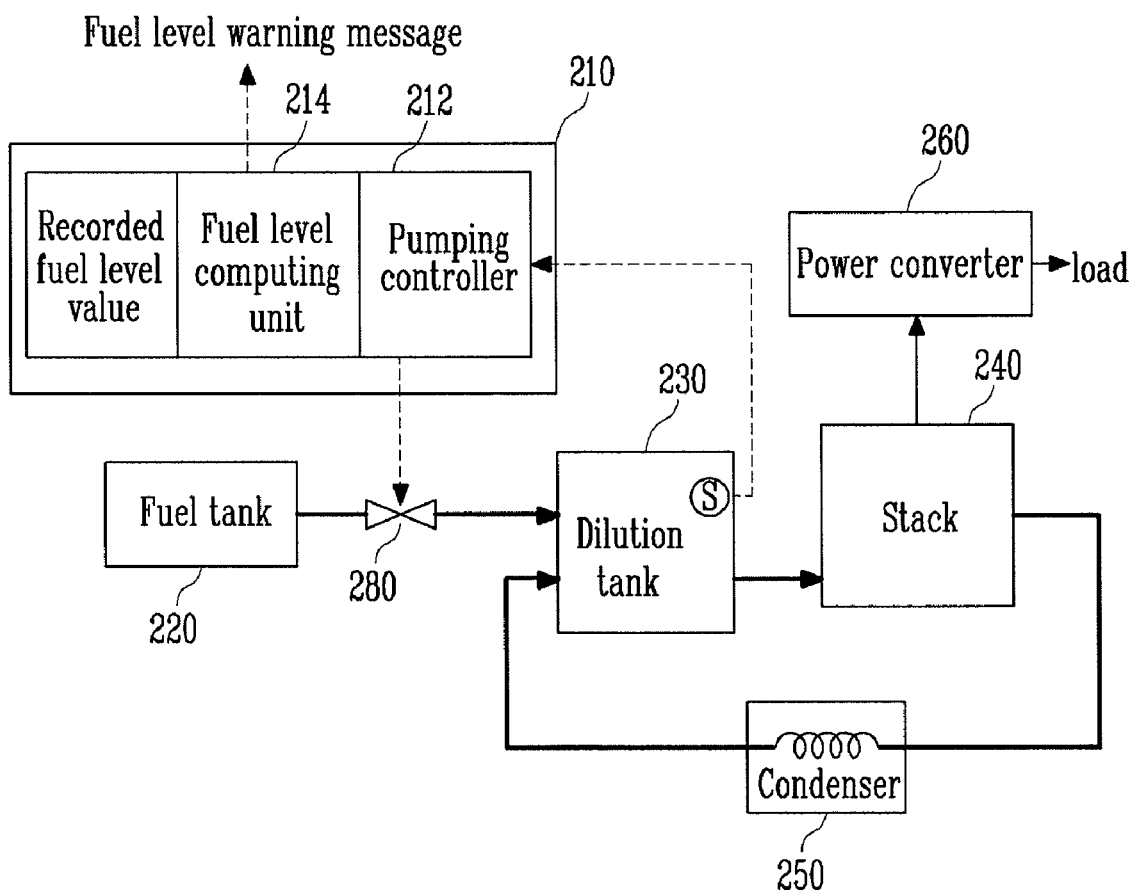
FIG. 3 is a schematic view showing a fuel cell system according to another embodiment.

Referring to FIG. 3, a fuel cell system according to another embodiment includes: a fuel tank 220 storing fuel for power generation; a stack 240 for generating electricity by an electrochemical reaction between the fuel and an oxidant; a fuel dilution tank 230 diluting the fuel supplied from the fuel tank 220 to a predetermined concentration before it is supplied to the stack 240; a fuel pump 280 for transferring fuel from the fuel tank 220 to the fuel dilution tank 230; a pumping controller 212 for generating a pump control signal that controls the operation of the fuel pump 280; and a fuel level computing unit 214 for computing the amount of fuel used and the fuel level from a waveform of the fuel pump control signal.

In the case of the fuel cell system according to the present embodiment, the fuel in the fuel tank 220 is diluted in the fuel dilution tank 230, and the diluted fuel is supplied to the stack 240. Such a structure is implemented, for example, when a stabilize performance of the fuel cell is sought. As such, the fuel pump 280 can supply the fuel to the fuel dilution tank 230 when the concentration of the diluted fuel in the fuel dilution tank 230 becomes lower than a reference concentration. The water for diluting the fuel in the dilution tank 230 may come, for example, from an extra water tank (not shown) or a condenser 250 that recovering water from cathode effluent.

Although the pumping controller 212 and/or the fuel level computing unit 214 may be implemented by an extra hardware module, it is preferable that the pumping controller 212 and the fuel level computing unit 214 are implemented as a software module, for example, as a program stored in a memory that is executable by a controller CPU. This implementation will be described below.

Although a fuel pump as described in the first embodiment may be used, it is preferable that the amount of fuel supplied by the fuel pump is determined according to the length of a "turn-on" section of a pulse width modulated (PWM) signal in order to more finely control the amount of fuel supplied. This embodiment is described below. A pump driven with a DC motor is an example of a suitable pump.

When the concentration of the fuel in the pump dilution tank 230 drops to less than a predetermined first reference concentration, the pumping controller 212 increases the concentration of the fuel by turning on the fuel pump 280. When the concentration of fuel in the pump dilution tank 230 rises to greater than a predetermined second reference concentration value, the pumping controller 212 stops the fuel pump 280. A sensor S communicates the fuel concentration in the fuel dilution tank 230, thereby providing continuous feedback to the pumping controller 212 during the operation of the system, thereby maintaining a constant concentration range of fuel in the dilution fuel tank 230. The concentration of the storage solution in the dilution fuel tank 230 may also be indirectly computed from the output of the stack or the amount of fluid flowing in and/or out to the dilution fuel tank 230, or it may be determined by directly sensing the concentration using a sensor as shown in FIG. 3.

The fuel tank 220 may comprise an exchangeable cartridge. When a fuel cartridge is exchanged or the fuel tank 220 refueled, the fuel level computing unit 214 resets the fuel level value to the capacity of the fuel tank 220.

Figure 4:
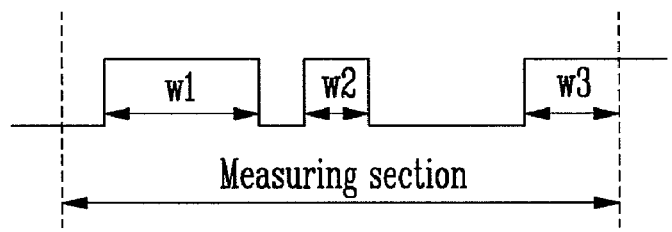
FIG. 4 is a view showing a PWM signal for driving a fuel pump of the fuel cell system of FIG. 1.

Thereafter, the pumping controller 212 generates a PWM signal for controlling the operation of the fuel pump 280 according to the concentration of the diluted fuel in the fuel dilution tank 230. In the illustrated embodiment, a sum total of time that the PWM signal is in a "turn-on" voltage state is determined by the fuel level computing unit 214 integrating the PWM signal for a predetermined measuring period and multiplying the integrated value by the amount of fuel that the fuel pump 280 pumps per unit time or throughput per unit time to compute the amount of the fuel used. An example PWM waveform is shown in FIG. 4. The amount of fuel used in a given fuel level measuring section in the drawing may be obtained by multiplying the sum of the lengths of time w1, w2 and w3 of the PWM signal by the pump throughput per unit time.

The fuel level computing unit 214 subtracts the calculated amount of fuel used from the fuel level value recorded therein to compute a current fuel level, and updates the record thereof. The fuel level value recorded in the fuel level computing unit 214 is not deleted when the fuel cell system stops, but is retained. As such, whenever the fuel cell system is operated, the fuel level in the fuel tank may be determined according to the operation of the fuel pump 280 as described above. When the fuel level is less than a predetermined reference amount, the fuel level computing unit 214 may output a low fuel warning message of a low fuel level to a user.

Those skilled in the art will understand that in other embodiments, a PWM signal and a suitable pump is used without a dilution tank, or a pulse control signal and suitable pump is used with a dilution tank, as would be apparent from the embodiments described above.

Other embodiments use other types of fuel pumps, for example, comprising a valve and a means generating pressure to draw-in or discharge fuel. In some embodiments, the valve is a sluice valve and the PWM signal for controlling the pump instead controls the operation of the valve. Embodiments in which a predetermined amount of fluid passes each sluice cycle of the valve are useful in conjunction with pulse control embodiments, as discussed above.

As the fuel cell system as discussed above is effective in determining a fuel level in a fuel tank without using a flux or flow sensing apparatus, thereby reducing manufacturing costs.

Although a certain embodiments have been shown and described, it would be appreciated by those skilled in the art that changes might be made in these embodiment without departing from the principles and spirit of the disclosure, the scope of which is defined in the claims and their equivalents.

What is claimed is:
1. A fuel cell system, comprising:
a fuel tank configured for storing fuel;
a fuel cell stack operable for generating electricity by an electrochemical reaction of a fuel and an oxidant;
a fuel pump directly fluidly connected to both the fuel tank and the fuel cell stack; and
a controller comprising a pumping controller and a fuel level computing unit, wherein the pumping controller is electrically connected to the fuel pump and operable for generating a pump control signal for controlling the operation of the fuel pump, and wherein the fuel level computing unit is operable for computing the amount of fuel used and a fuel level in the fuel storage tank from a waveform of the pump control signal.

2. The fuel cell system of claim 1, wherein the fuel level computing unit is configured to record the calculated fuel level therein, and configured to reset the recorded fuel level value to a capacity of the fuel tank when the fuel tank is refilled.

3. The fuel cell system of claim 1, wherein the fuel pump comprises a diaphragm pump, and wherein the fuel level computing unit is configured to determine the amount of fuel used by multiplying a number of pulses in the pump control signal by a single pulse pumping throughput of the diaphragm pump.

4. The fuel cell system of claim 1, wherein the fuel pump comprises a piezo injection pump, and wherein the fuel level computing unit is configured to determine the amount of fuel used by multiplying a number of pulses in the pump control signal by a single pulse pumping throughput of the piezo injection pump.

5. The fuel cell system of claim 1, wherein the pump control signal comprises a PWM signal, and the fuel level computing unit is configured to determine the amount of fuel used by a method comprising integrating the PWM signal to obtain a time-on value and configured to multiply the time-on value by the pumping throughput per the unit time.

* * * * *